United States Patent [19]

Wall

[11] Patent Number: 5,125,059
[45] Date of Patent: Jun. 23, 1992

[54] FIBER OPTIC TERMINUS

[75] Inventor: Stephen W. Wall, Costa Mesa, Calif.

[73] Assignee: Hughes Aircraft Company, Los Angeles, Calif.

[21] Appl. No.: 689,422

[22] Filed: Apr. 22, 1991

[51] Int. Cl.⁵ .......................... G02B 6/36; G02B 7/26
[52] U.S. Cl. ..................................................... 385/81
[58] Field of Search .......................... 350/96.20, 96.21

[56] References Cited

U.S. PATENT DOCUMENTS 4,941,727  7/1990  Maranto et al. ................ 350/96.21

*Primary Examiner*—William L. Sikes
*Assistant Examiner*—Robert E. Wise
*Attorney, Agent, or Firm*—Terje Gudmestad; Wanda K. Denson-Low

[57] ABSTRACT

An optical fiber terminus is provided in which front and rear connector bodies 15, 22 are provided, each having a bore 16, 35, 36, with a counterbore 17 being formed in the rearward end of the front connector body 15. A sleeve 42 of resilient material is positioned in the counterbore and an optical fiber 13 is extended through the sleeve 42 and the bores 16, 35, 36. The rear connector body 20 is advanced a predetermined distance into the counterbore 17, which it engages with a press fit, so that it engages and compresses the sleeve 42, and causes the sleeve 42 to grip and retain the optical fiber 13.

7 Claims, 1 Drawing Sheet

U.S. Patent June 23, 1992 5,125,059
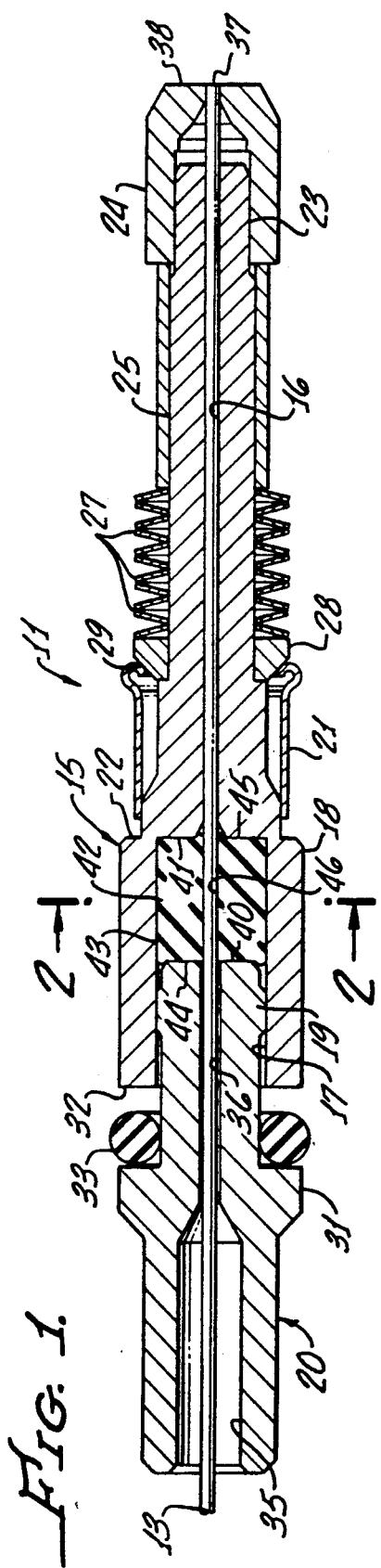
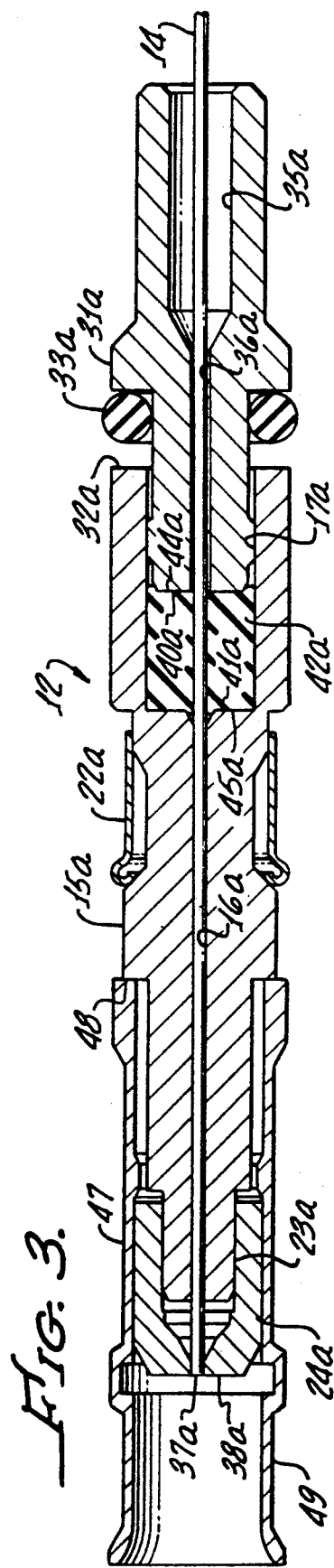
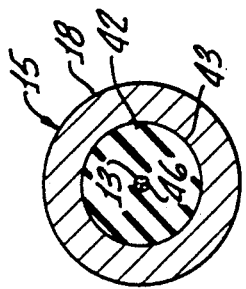

FIBER OPTIC TERMINUS

BACKGROUND OF THE INVENTION

1. Field of the Invention

The field of this invention is that of optical fiber connectors and is particular to the retention of an optical fiber in a terminus.

2. Description of Related Art

Optical fibers commonly are connected by pin and socket type connectors which position the ends of two optical fibers in adjacency so that light can be transmitted from one to the other. This type of connector may take a variety of forms, but will include a pin terminus having a forward end that is received within a socket at the forward end of the socket terminus to align the two connector sections. Frequently, the forward ends of the optical fibers will be in abutment in the mated connector.

In order to minimize light attenuation across the connector, it is essential that the optical fibers be firmly and securely held within the two connector sections. Minor amounts of movement of the optical fibers can result in misalignments which produce unacceptably large optical losses.

A common technique for securing the fibers in the connector bodies is to make use of an adhesive to bond the fibers in position. Although this can result in a secure attachment, it penalizes production rates because of the cure time required for the adhesive. The shelf life of the adhesive is limited which is a factor adding to the cost and complexity of production and which makes field use difficult. Adhesives can be difficult to handle.

Another means of attachment of the optical fiber is to crimp a portion of the connector body inwardly around the fiber to grip the fiber at a contracted zone. The crimping operation must be carefully controlled in order to achieve precisely the desired amount of gripping force. Even so, localized areas of excessive pressure may result which can cause minute localized bending and resulting attenuation of the light signal. Also, when the connector is subjected to temperature extremes, the crimp connection may become either too loose or too tight, again resulting in optical losses.

Another type of optical fiber connector, owned by the same assignee as that of this invention, provides a small grommet of elastomeric material near the forward end of the connector body surrounding the optical fiber. This grommet is compressed by a spring loaded plunger and is intended to grip the fiber to retain it in the connector. However, resulting retention force is relatively small that the fiber is not held as securely as it should be. Also, a spring arrangement is necessary to compensate for temperature fluctuations. This adds to the complexity and weight of the connector.

SUMMARY OF THE INVENTION

The present invention provides an optical fiber connector with an improved arrangement for retaining the fiber so that it is held securely yet losses in the light signal are minimal. The fiber retention arrangement uses no adhesives and is easily accomplished in mass production. Not only is the fiber retained securely but variations in temperature are accommodated without any auxiliary means. The overall construction is simple and economically manufactured.

The optical fiber terminus includes a front body and a rear body, each having a bore through which an optical fiber can be extended. The front connector body has a counterbore at its rearward end. Received within this counterbore is a sleeve of pliable material, preferably resilient material, such as silicone rubber. The forward end of the rear connector body fits within the counterbore of the front connector body with a press fit. The rear connector body is advanced a predetermined distance into the counterbore so as to cause a known compression of the sleeve. As a result, the sleeve, being confined within the counterbore, is deflected inwardly toward its axis and into firm engagement with the buffer or cladding of the optical fiber. This generates a uniform frictional force which securely retains the optical fiber within the connector while permitting efficient optical coupling.

BRIEF DESCRIPTION OF THE DRAWINGS

FIG. 1 is a longitudinal sectional view of the pin terminus of an optical fiber connector incorporating the invention;

FIG. 2 is a transverse sectional view taken along line 2-2 of FIG. 1; and

FIG. 3 is a longitudinal sectional view of a socket terminus embodying the invention.

DESCRIPTION OF THE PREFERRED EMBODIMENTS

The optical fiber connector of this invention includes a pin terminus 11 that mates with a socket terminus 12 for interconnecting optical fibers 13 and 14.

The pin terminus 11, as seen in FIG. 1, includes a front connector body 15 of cylindrical shape which has a bore 16 extending through it. A counterbore 17 is provided in the rearward end portion 18 of the front connector body, where the pin terminus 11 is enlarged and of its maximum diameter. The counterbore 17 receives the forward end portion 19 of the rear connector body 20. This is a press fit.

Exteriorly, a retainer clip 21 circumscribes the front connector body forwardly of a shoulder 22. At the forward end of the front connector body 15, the exterior surface 23 is of reduced diameter and is received with a press fit within a guide bushing 24. Rearwardly of the surface 23 is an exterior cylindrical surface 25 which is of slightly larger diameter than the surface 23 and terminates at a radial shoulder 26 near the forward end of the retainer clip 20. The surface 25 is circumscribed by a series of Belleville washers 27 which act as a spring. The rearward one of the Belleville washers 27 bears against one end of a washer 28, the opposite end of the washer engaging the shoulder 26. The outer corner 29 of that end of the washer 28 is beveled and engaged by the forward end of the retainer clip 20. A spacer sleeve 30 circumscribes the surface 25 of the front body 15 between the guide bushing 24 and the stack of Belleville washers 27. The foregoing construction is conventional.

The rear connector body 20 includes an annular enlargement 31 spaced from the rearward end 32 of the front connector body 15. This provides an annular recess that receives a seal 33.

The rear connector body 20 includes an enlarged bore section 35 that extends from its rearward end and communicates with a smaller diameter bore portion 36 that continues axially through the remainder of the rear body portion. The optical fiber 13 is received in the bores 35 and 36 of the rear body 20, and the bore and counterbore 16 and 17 of the front body. An opening 37 in the guide bushing 24 closely confines the fiber 13 at the forward end of the pin terminus 11. The end of the fiber 13 is in the same plane as the flat forward end 38 of the guide bushing 24.

Received within the counterbore 17 of the front body portion 15, between the flat radial forward end 40 of the rear body portion 20 and a transverse wall 41 at the inner end of the counterbore, is a sleeve 42 of pliable material, preferably a resilient elastomeric material. The sleeve 42 has a cylindrical exterior surface 43 and radial end walls 44 and 45 that match the radial walls 40 and 41 of the rear and front bodies 20 and 15, respectively. A bore 46 extends through the sleeve and receives the optical fiber 13.

The sleeve 42 serves to securely retain the fiber 13 in the pin terminus 11 without any significant attenuation of the light signal transmitted through the fiber. The fiber is secured by advancing the rear body 20 a predetermined distance within the counterbore 17 to exert a known compressive force on the sleeve 42. Being confined at its end faces and on its circumference, the sleeve 42 is caused to become compressed at its bore 46 around the fiber 13. This generates a high static frictional force which securely holds the fiber against withdrawal forces. At the same time the fiber 13 is not distorted or otherwise disturbed so that there is almost no degradation of the strength of the light signal transmitted through it. The compressed elastomeric sleeve 42 compensates for dimensional changes occurring because of temperature fluctuations so that no auxiliary temperature compensating arrangement is necessary.

Silicone rubber of around 70 durometer may be used for the sleeve 42. The sleeve may be from 0.030 inch to 0.050 inch in length, with an outside diameter of 0.040 inch and a bore diameter of 0.020 inch where the fiber 13 has a buffer coating 0.018 inch in diameter.

In most respects the construction of the socket terminus 12 is similar to that of the pin terminus 11. Parts corresponding to those of the pin terminus have been given the suffix "a" in reference numbers in the drawing. A major difference between the two connector sections is that in the socket terminus 12 the Belleville washers 27 and spacer sleeve 30, as well as the washer 27, are omitted. An alignment sleeve 47 is extended over the guide bushing 24a and the forward end portion of the front connector body 15a of the socket terminus. The exterior of the guide bushing 24a fits with a press fit inside the alignment sleeve 47 and the latter engages a shoulder 48 on the exterior of the front connector body 15a. In the mated connector, the guide bushing 24 of the pin terminus 11 fits within a forward socket portion 49 of the alignment sleeve 46, aligning the connector bodies and hence the two fibers 13 and 14 so that their forward end faces can abut to efficiently transmit light from one to the other.

Within the socket terminus 12, an elastomeric sleeve 42a fits within the counterbore 17a of the front body 15a, just as does the sleeve 42 in the counterbore 17 of the pin terminus 11. The sleeve 42a is compressed by the rear body 20a as the rear body is advanced into the counterbore 17. Again, the compression of the sleeve 42a frictionally grips the fiber 14 so that that fiber is securely held in the socket terminus 12. The same advantages accrue to the fiber retention in the socket terminus.

The foregoing detailed description is to be clearly understood as given by way of illustration and example only, the spirit and scope of this invention being limited solely by the appended claims.

I claim:

1. An optical fiber terminus comprising
   a front connector body having a forward and rearward end,
   a rear connector body,
   each of said connector bodies having an opening therein, the rearward portion of said front connector body having an enlarged counterbore therein,
   an optical fiber received in said openings, and
   a resilient member received in said enlarged counterbore in said front connector body,
   said resilient member having an opening therethrough receiving said optical fiber,
   a portion of said rear connector body being received in said enlarged counterbore in said front connector body and positioned such that it engages said resilient member and causes a predetermined compression thereof such that said resilient member is compressed around said optical fiber at said opening through said resilient member so as to frictionally grip said optical fiber and prevent axial movement thereof relative to said connector bodies.

2. An optical fiber terminus comprising
   a front connector body,
   a rear connector body,
   each of said connector bodies having a forward end and a rearward end, and a bore extending between the forward and rearward ends thereof,
   an optical fiber received in said bores of said connector bodies,
   means on said front connector body for positioning said optical fiber with an end thereof adjacent said forward end of said front connector body for optical coupling with a mating optical fiber terminus, the rearward portion of said front connector body being enlarged and having a cylindrical counterbore therein and a transverse wall at the inner end of said counterbore,
   an elastomeric sleeve received in said counterbore,
   said optical fiber being received in said sleeve, and
   means for positioning the forward end portion of said rear connector body axially in said counterbore at a predetermined fixed location such that the forward end of said rear connector body engages one end of said sleeve, and said sleeve is compressed by said rear connector body, the circumferential wall of said counterbore and said transverse wall so as to frictionally grip said optical fiber and retain the same in said optical fiber terminus.

3. A device as recited in claim 2 in which said transverse wall of said counterbore is in a radial plane, said forward end of said rearward connector body is radial and said ends of said sleeve are radial.

4. An optical fiber terminus comprising
   a front connector body,
   a rear connector body, each of said bodies having a bore extending therethrough between a forward end and a rearward end,
   said front connector body having a counterbore at the rearward end thereof, said counterbore defining a circumferential wall and a transverse wall extending from said circumferential wall to said bore, said rear connector body having a forward portion terminating in a transverse forward end wall, said forward portion being telescopingly received in said counterbore with a press fit relative to said circumferential wall of said counterbore, a sleeve of resilient elastomeric material in said counterbore between said forward end wall of said rear connector body and said transverse wall of said front connector body, said sleeve having an axial opening therethrough, and an optical fiber extending through the bores of said front and rear connector bodies and through said axial opening of said sleeve, said forward portion of said rear connector body being positioned in said counterbore such that said sleeve is confined by said forward end wall, said transverse wall of said front connector body and said circumferential wall and is compressed at said axial opening such that said sleeve bears against and frictionally grips said optical fiber and precludes axial movement of said optical fiber relative to said front and rear connector bodies and to said sleeve.

5. A device as recited in claim 4 in which said transverse wall of said front connector body is in a radial plane relative to said bore in said forward connector body, said forward end wall is in a radial plane relative to said bore in said rearward connector body, and said sleeve has ends which are in a radial plane relative to said axial opening through said sleeve.

6. A device as recited in claim 5 in which said sleeve is of silicone rubber of around 70 durometer.

7. The method of providing an optical fiber terminus and retaining an optical fiber therein comprising the steps of forming a front connector body,
forming a bore through said front connector body,
forming a counterbore in the rearward end of said front connector body,
forming a rear connector body,
  with said counterbore and said rear connector body being proportioned such that the forward end portion of said rear connector body can enter said counterbore and have a press fit therewith,
forming a bore through said rear connector body,
forming a sleeve of resilient elastomeric material,
positioning said sleeve in said counterbore,
extending an optical fiber through said bore in said rear connector body, said sleeve and through said bore and counterbore in said front connector body such that an end of said optical fiber is adjacent the forward end of said front connector body, and
then advancing the forward end portion of said rear connector body a predetermined distance into said counterbore so as to engage and compress said sleeve and cause said sleeve to be deflected inwardly, thereby to grip said optical fiber and preclude substantial axial movement of said optical fiber relative to said sleeve and said front and rear connector bodies.

* * * * *